United States Patent
Dadgar et al.

(10) Patent No.: US 12,541,536 B1
(45) Date of Patent: Feb. 3, 2026

(54) EFFICIENT DATA SYNCHRONIZATION AND SEGREGATION USING VIRTUALIZED AND MODULAR REPRESENTATIONS

(71) Applicant: International Business Machines Corporation, Armonk, NY (US)

(72) Inventors: Armon Dadgar, San Francisco, CA (US); Jeffrey A. Mitchell, Newton, MA (US); Brian M. Kassouf, San Francisco, CA (US); Christopher S. Hoffman, Hockessin, DE (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/422,316

(22) Filed: May 24, 2019

Related U.S. Application Data (60) Provisional application No. 62/716,535, filed on Aug. 9, 2018.

(51) Int. Cl.
*G06F 16/27* (2019.01)
*G06F 16/22* (2019.01)
*H04L 67/1097* (2022.01)

(52) U.S. Cl.
CPC ........ *G06F 16/275* (2019.01); *G06F 16/2246* (2019.01); *G06F 16/2255* (2019.01); *H04L 67/1097* (2013.01)

(58) Field of Classification Search
CPC ..................................................... G06F 16/275
USPC ......................................................... 707/620
See application file for complete search history.

(56) References Cited

U.S. PATENT DOCUMENTS

| | | | |
|---|---|---|---|
| 4,309,569 A | 1/1982 | Merkle | |
| 2018/0075253 A1* | 3/2018 | Auh | ...... H04L 9/3242 |
| 2018/0374173 A1* | 12/2018 | Chen | ...... H04L 9/3236 |
| 2019/0361842 A1* | 11/2019 | Wood | ...... H04L 9/3247 |
| 2020/0356991 A1* | 11/2020 | Saraniecki | ...... G06Q 20/10 |

* cited by examiner

*Primary Examiner* — Syling Yen
(74) *Attorney, Agent, or Firm* — CANTOR COLBURN LLP; Stosch Sabo (57) ABSTRACT

Embodiments of the present invention involve composing synchronization structures that enable increased synchronization control. A virtual synchronization structure enables synchronization using structure traversal without replicating the full data set. This results in computing systems that are at a desired level of synchronization without full data replication. This method has the advantage of enabling limited sharing between systems and also speed.

19 Claims, 9 Drawing Sheets

EFFICIENT DATA SYNCHRONIZATION AND SEGREGATION USING VIRTUALIZED AND MODULAR REPRESENTATIONS

CROSS-REFERENCE TO RELATED APPLICATIONS

This application claims priority of U.S. provisional application Ser. No. 62/716,535 filed Aug. 9, 2018 and titled "Efficient Data Synchronization and Segregation Using Virtualized and Modular Representations" by the present inventors.

BACKGROUND

In conventional computing systems, data is synchronized between systems by using tree-like or table-like representations of data, also referred to as synchronization structures. Conventional synchronization structures maintain information about local state. Due to the abstract nature of data structures, state can be one or more of a wide variety of data elements that can be tracked and synchronized. State often consists of the bits making a set of files, objects, database records, and so on. Conventional synchronization structures are further used as a primitive to facilitate discovery of non-shared state and for transfer of state and data as necessary to achieve fully shared state between two or more computing systems. These synchronization structures may contain data directly or they may refer to data via some identifier, such as a file path, tokenized value, metadata, a hash/digest, or a hash-based message authentication code (HMAC).

One example conventional synchronization structure is a Merkle tree which is described in U.S. Pat. No. 4,309,569. In cryptography and computer science, a Merkle tree, also referred to as a hash tree, is a tree in which every leaf node is labeled with the hash of a data block and every non-leaf node is labeled with the cryptographic hash of the labels of its child nodes. Hash trees enable efficient and secure verification of the contents of large data structures. Showing that a leaf node is a part of a particular binary hash tree is done by computing a number of hashes proportional to the logarithm of the number of leaf nodes of the tree. Hash trees can also be used to verify any kind of data stored, handled and transferred in and between computers. Hash trees, for example, further enable confirmation that data blocks received from other peers in a peer-to-peer network are received undamaged and unaltered.

In a Merkle tree, each node has a value that represents an associated piece of data combined with similarly-derived representations of values further down the tree, such that a final value of a parent tree node is dependent on the values of all of its children. Often this is implemented by a digest function (using a cryptographic key, such as a digest-based HMAC, also referred to herein simply as a "digest") of the data being tracked by that node. The value is calculated by performing an exclusive-OR (XOR) operation of the parent digest with the digest values of all child nodes.

In one example, using a contrived digest function for the purposes of simplicity, suppose node A is the root of a Merkle tree and has child nodes B and C. Suppose that A, B, and C represent files whose contents digest to values of, in binary, 01010101, 00001111, and 11110000, respectively. The final values stored in nodes B and C would be the matching digest values for those files. The node value stored in A, however, would be an XOR of the digest values of file A and the node values of B, and C, leading to a final node value for A of 10101010.

This and other similar conventional data structures allow for efficient synchronization of distributed systems because these data structures minimize the number of comparisons to be performed to establish synchronization. When a given node in the Merkle tree is examined on a local and on a remote system, if the local node value does not match the remote node value, the respective values of their child nodes can be compared. For any child node whose value matches the remote child node, no further traversal down the tree through that child node need be performed, because the state of all values under that child can be presumed to match in both the local and remote systems. This allows the differences between the trees on the two systems to be determined efficiently. The differences may then be used to perform state transfer. A node that does not exist on one system or the other will also result in a mismatch between node parent node values and comparison of them is obvious.

In another simple example, suppose, in a local computing system, a Merkle tree of arbitrary depth has the root Node A and two children, Node B and Node C. In this example, Node A has a value of X, and nodes B and C have values of Y and Z respectively. In performing a comparison with a remote system, it is discovered that the remote system's root Node A has value X'. Therefore the children of Node A on the remote system are checked. When checking nodes B and C on the remote system, it is discovered that B has value Y and C has value Z'. At this point, because B's value is dependent on the value of all nodes at a further depth in the tree branching off of Node B, and B's value matches that of the local tree, traversal of the tree via node B can be stopped. Traverse of the tree is continued through Node C with comparisons at each node along the way. As the traversal is continued, a list of child nodes having differing data values is developed. This list is used to select a set of state changes to transfer to the remote system. The state changes may include deletions of nodes, additions of nodes (and associated data that the node values represent), or changes to the data that a node's value represents. After transfer of data to the remote system, the value of the remote system's root node is tested. If it does not match the local system's root node value, the synchronization procedure can be repeated with the purpose of achieving synchronization.

The synchronizations described above are limited to achieving identical local and remote trees. There are, however, instances where such synchronizations are not needed or are not desirable. For example, data distribution in data subscription services and data screening for security reasons.

It remains desirable to have improved data synchronization methods and systems.

SUMMARY

The present invention is directed to improved methods for composing synchronization structures that enable greater synchronization control.

There are instances where it is desirable for less than the full set of data stored on a system to be synchronized. These instances, also referred to as modes, define the sets or subsets of data for synchronization. For example, in archival mode, all data is synchronized. In a mode referred to as distribution mode, a subset of data to be shared is determined. To accomplish synchronization in distribution mode, for example, a virtual synchronization structure related to the defined subset of data is created. The virtual synchronization structure enables synchronization using structure traversal without replicating the full data set. This results in computing systems that are at a desired level of synchronization without full data replication. This method has the advantage of enabling limited sharing between systems and also speed.

Alternative embodiments allow for the synchronization structure on a given system to be composed of multiple sub-structures that each represent a subset of the underlying data. One or more of these subsets can be combined to represent a single virtual synchronization structure. The single virtual synchronization structure enables distinct modes of synchronization functionality, where a single system can operate in a multiple of these modes concurrently, and thus keep track of multiple definitions of local state concurrently. Synchronization functionality to non-local systems may therefore simultaneously represent different notions of local state. These modes, or profiles, may be preconfigured or may be user-configured.

Further alternative embodiments enable the information contained within a synchronization structure to be fully separate from the data it represents, and thus for state updates to be processed by the system's synchronization structure without the processing system having access to the actual underlying data referred to by the state updates. This allows for filtering of data sent between systems based on factors such as geographical, geopolitical, performance, and security needs. This filtering can be configured via multiple paradigms, such as allow lists and deny lists.

In further alternative embodiments, the methods described above can be combined such that within a given mode of synchronization, specific sets of data may be filtered. Authentication and authorization can be wrapped around both types of functionality such that both systems and their operators agree on the data that is to be synchronized, with the methods of the present invention used to then reasonably guarantee that only the agreed-upon data is sent between systems.

The methods disclosed herein allows for state synchronization between member systems to be fully maintained while adding important new functionality not typically achievable in conventional synchronization systems.

Further embodiments include a computing system for data synchronization and segregation using virtualized and modular representations including a primary data store storing data in a hash tree structure, where the hash tree structure includes a plurality of nodes and each node of the plurality has a digest and a data portion. The computing system also includes a modes module for storing a plurality of modes. Each mode describes a data distribution operation for distributing a subset of the data stored in the primary data store to other data stores. The computing system also includes a synchronization structure module for creating virtual data synchronization structures. At least one virtual data synchronization structure accomplishes each of the modes in the plurality of modes. The computing system provides at least one virtual data synchronization structure to a distribution peer computing system. The computing system receives requests for data updates from the distribution peer computing system in accordance with the mode used to create the at least one virtual data synchronization structure. In an alternative embodiment, the primary data store is distributed among a plurality of computing systems.

In a further alternative embodiment, the computing system provides at least one virtual data synchronization structure to each of a plurality of distribution peer computing systems. The computing system receives requests for data updates from each of the plurality of distribution peer computing systems. In another alternative embodiment the primary store and the distribution peer computing system have, when in a state of synchronization, independent authentication data.

In another alternative embodiment the modes module includes modes based on a limiting factor related to the distribution peer computing system. In one arrangement, the limiting factor is a geolocation of the distribution peer computing system.

A still further embodiment is a computer-implemented method for data synchronization and segregation. The method includes a step of determining a mode, the mode describing a data distribution operation on a peer computing system, the data distribution operation to accomplish a data distribution of a subsection of data stored in a primary data store to the peer computing system. The computer-implemented method further includes constructing a virtual hash tree according to the mode, where the virtual hash tree comprises a representation of the subsection of data. The virtual hash tree is provided to the peer computing system which operates on the virtual hash tree and returns a data request. Data is then distributed to the peer computing system according to the data request.

In an alternative arrangement, the computer-implemented method includes configuring the peer computing system to establish the mode.

In an alternative embodiment, the computer-implemented method includes a data request that is a list of differences between a local hash tree on the peer computing system and the virtual hash tree. In another alternative embodiment, constructing the virtual hash tree includes filtering data by operating on selected nodes in the virtual hash tree. In an alternative arrangement, operating on selected nodes in the virtual hash tree involves replacing data stored in a data portion of each node with a flag.

In an alternative embodiment, the computer-implemented method includes determining a plurality of modes where the plurality of modes describes data distribution operations on a plurality of peer computing systems. The data distribution operations accomplish data distributions of subsections of data stored in a primary data store to the plurality of peer computing systems. The method further includes constructing virtual hash trees according to the modes where each virtual hash tree includes a representation of a selected subsection of data stored in the primary data store. The virtual hash trees are then provided to the peer computing systems.

In a still further alternative embodiment, the computer-implemented method includes determining a mode by describing a data distribution operation on a peer computing system, the data distribution operation to accomplish a data distribution of a subsection of data stored in a plurality of primary data stores to the peer computing system.

Another embodiment includes a non-transitory computer-readable storage medium storing a computer program, that when executed by at least one processor, causes the processor to perform a method for data synchronization and segregation. The method first determines a mode where the mode describes a data distribution operation on a peer computing system. The data distribution operation accomplishes a data distribution of a subsection of data stored in a primary data store to the peer computing system. The method then constructs a virtual hash tree according to the mode. The virtual hash tree includes a representation of the subsection of data. The virtual hash tree is provided to the peer computing system. The peer computing system returns a data request in response to the virtual hash tree. Data is distributed to the peer computing system according to the data request.

In an alternative arrangement, the non-transitory computer-readable storage medium provides an operation configuring the peer computing system to establish the mode. In another alternative embodiment, the data request is a list of differences between a local hash tree on the peer computing system and the virtual hash tree.

In one embodiment, the non-transitory computer-readable storage medium includes constructing the virtual hash tree by filtering data by operating on selected nodes in the virtual hash tree. In an alternative arrangement operating on selected nodes in the virtual hash tree involves replacing data stored in a data portion of each node with a flag.

In an alternative embodiment, the non-transitory computer-readable storage holds a process for determining a plurality of modes. The plurality of modes describe data distribution operations on a plurality of peer computing systems. The data distribution operations accomplish data distributions of subsections of data stored in a primary data store to the plurality of peer computing systems. The process further includes constructing virtual hash trees according to the modes where each virtual hash tree includes a representation of a selected subsection of data stored in the primary data store. The process further involves providing the virtual hash trees to the peer computing systems.

In a further alternative embodiment, the process in the non-transitory computer-readable storage medium includes determining the mode describing a data distribution operation on a peer computing system where the data distribution operation accomplishes a data distribution of a subsection of data stored in a plurality of primary data stores.

The present invention together with the above and other advantages may best be understood from the following detailed description of the embodiments of the invention illustrated in the drawings, wherein:

DESCRIPTION

Embodiments of the present invention include systems and methods that compose and operate on data synchronization structures that enable complex synchronizations of electronically-stored data.

Figure 1:
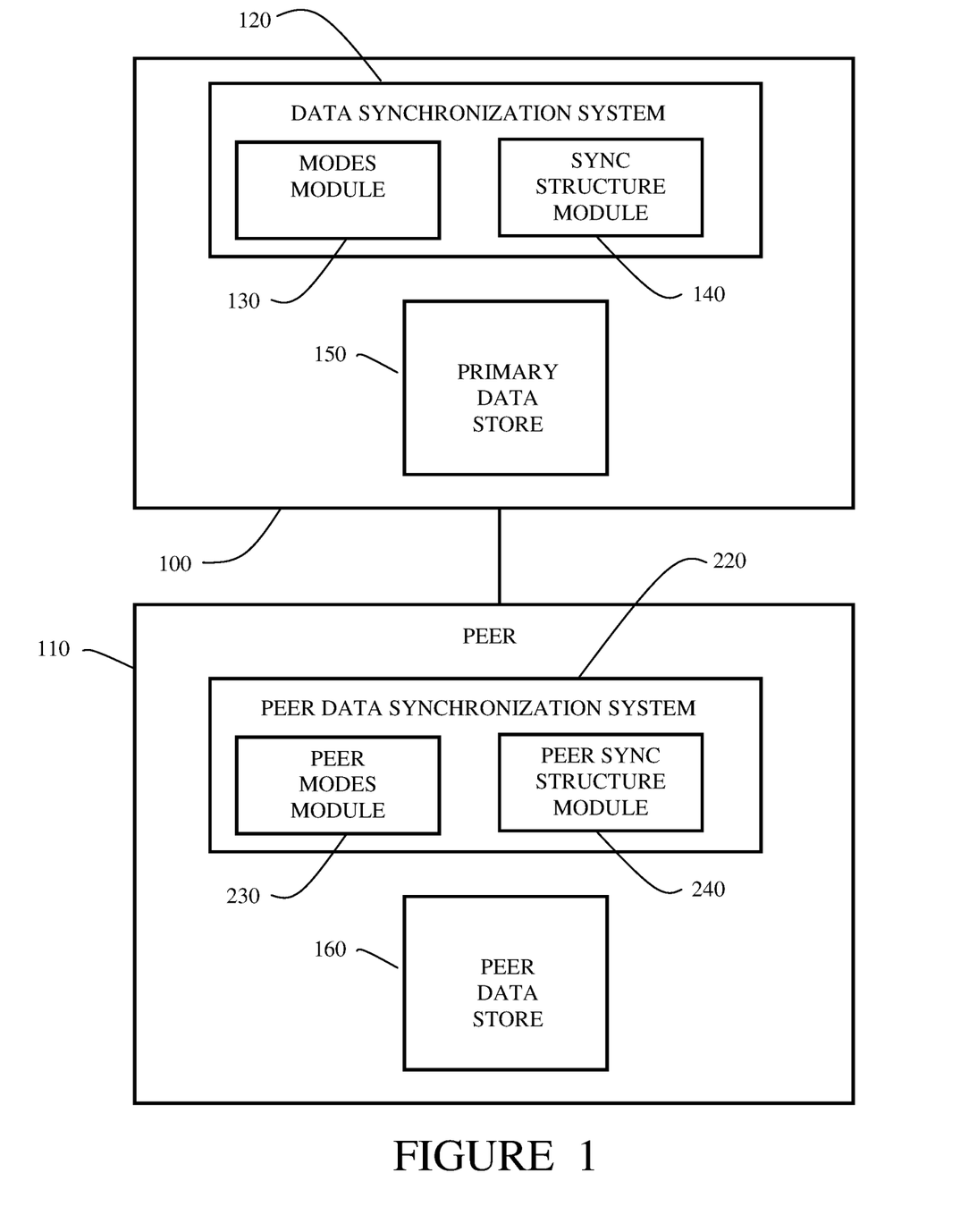
FIG. 1 is a networked computing system suitable for implementing embodiments of the present invention.

FIG. 1 is a block diagram of an embodiment of a data synchronization system 120 implemented in a computer system 100 according to principles of the invention. The data synchronization system 120 includes a modes module 130 and a synchronization structure module 140. A data store 150 in the computer system 100 stores a primary data set. The data store 150 is also referred to as the primary data store. A peer computer 110 is connected to the computer system 100. The peer computer 110 has a peer data synchronization system 220 and a peer data store 160 storing a peer data set 160, also referred to as "peer data". The peer data synchronization system 220 includes a peer modes module 230 and a peer synchronization structure module 240. The general purpose computer and the peer computer are under the control of suitable operating systems. The data synchronization system 120 may be implemented, in alternative embodiments, in more than one general purpose computer such as a configuration of computer systems using multiple central processing units, either local or distributed processing or local area networks (LAN) or wide area networks (WAN. The peer computer 110 may communicate with the system or systems having the data synchronization system 120 over a LAN or WAN or over the internet. Other computer configurations are possible within the scope of the invention. It should be understood that a typical implementation of the data synchronization system involves many, for example, hundreds, of peer computers to which data is distributed. The present example is simplified for the purposes of clarity. With regard to system configurations, the hierarchy of systems may be redefined. That is, a peer system in the network of systems can be redefined to be a primary and the primary may be redefined to be a peer.

The operation of the data synchronization system 120 synchronizes the primary data and the peer data. In the present document, the concept of synchronicity is not equivalent to achieving identical data on each system. As will be explained below, synchronization refers to achieving efficient and correct data distribution using data synchronization structures.

The data in the primary data store 150 and in the peer data store 160 are stored as hash trees, also known as "Merkle trees". Each hash tree has a root node and a plurality of child nodes. This is described in greater detail below with regard to FIG. 2. The data synchronization system 120 operates to provide selected data from the primary data set to the peer data set. The operation of providing data to a peer is referred to as synchronization and the types of synchronization are referred to as "modes." For example, if the entire data in the primary data store 150 is to be provided to the peer, as in a system backup, for example, the mode is referred to as "archival mode." The data synchronization system 120 is also capable of modes for providing subsets of the primary data. The modes module 130 stores the modes and the hash tree nodes associated with each mode. The modes may be preset or may be user-defined. Further, the modes may also be changed dynamically and data will be synchronized accordingly. The synchronization structure module 140 receives the hash tree node information from the modes module 130 and creates the synchronization structure that will accomplish a particular mode. The data synchronization system 120 is an improvement upon conventional data synchronization in that it is a system having the speed and efficiency of the hash tree traversals however also having the capability of synchronizing partial data sets.

The data synchronization system 120 composes virtual synchronization structures from sub-structures to enable multiple modes, or profiles, of operation. The data synchronization system 120 identifies sets of data defined to enable different synchronization modes, including data defined for multiple modes. The identified data sets are separated into distinct synchronization sub-structures also referred to as virtual synchronization structures. Virtual synchronization structures are then composed of one or more of the sub-structures. The data synchronization system exposes one of several possible virtual synchronization structures to the peers depending on the mode, or type, of synchronization to be performed. The modes or data profiles may be pre-defined or they may be user-defined. An advantage of data synchronization system 120 is that data that exists on each computing storage system but is not covered by a virtual synchronization structure when operating in a particular synchronization mode can be distinct between the data storage systems without causing the data storage systems to be considered out of synchronicity.

Figure 2:
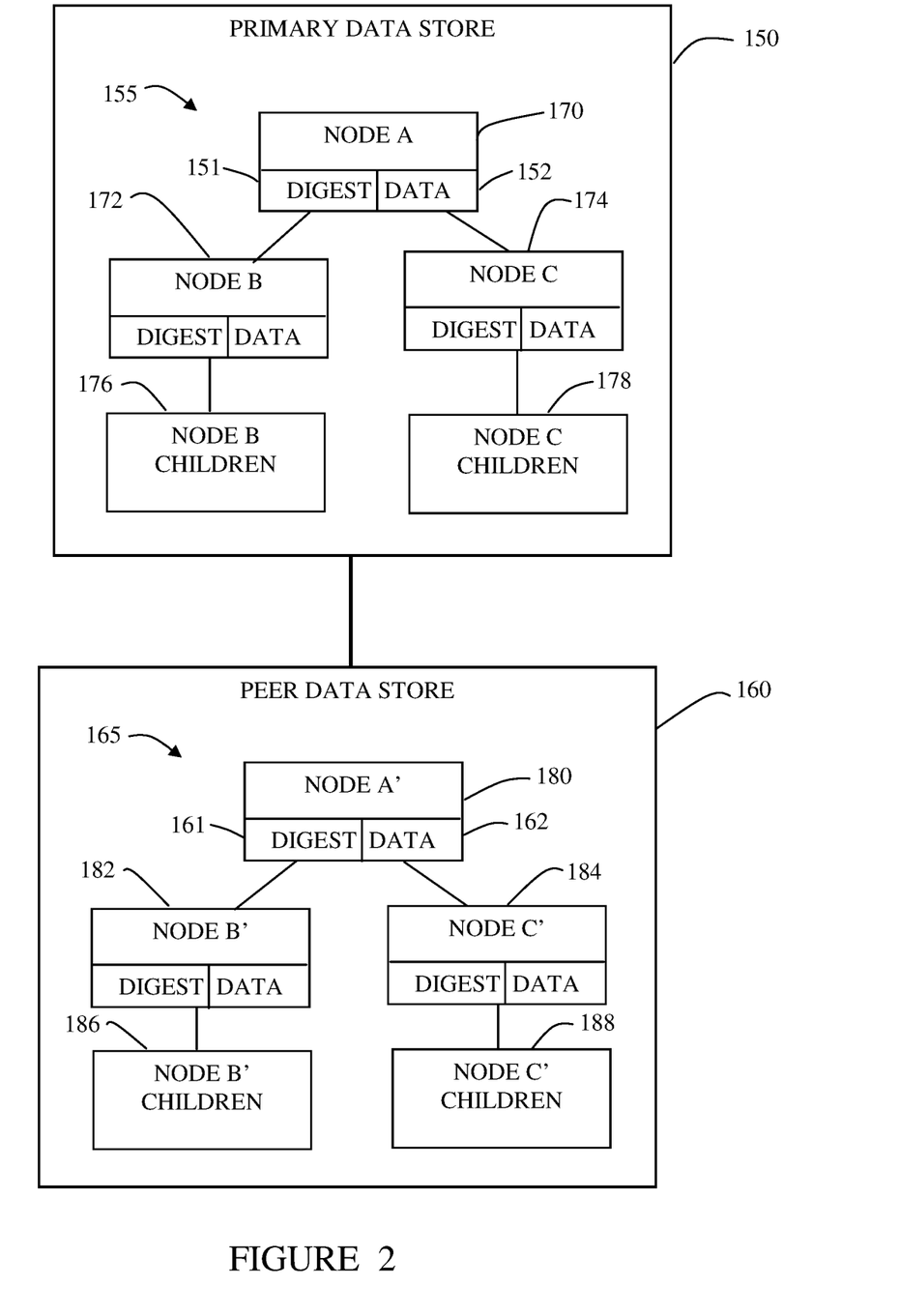
FIG. 2 is a block diagram of the primary data store and the peer data store of FIG. 1.

FIG. 2 is a block diagram of the primary data store 150 and peer data store 160 of FIG. 1 having simplified example hash trees. The primary 150 stores data in a first hash tree, or "first Merkle tree" 155, and the peer 160 stores data in a second hash tree, or "second Merkle tree" 165. The first Merkle tree 155 has a root node, Node A 170 which has a digest 151, or "hash", and a data portion 152. Node A 170 has two child nodes, Node B 172 and Node C 174, each having its own digest and data portions. Node B 172 and Node C 174 each have a plurality of children nodes simplified herein as elements 176 and 178 respectively. The second Merkle tree 165, stored in the peer 160, is equivalent to that in the primary 150. That is, the second Merkle tree 165 has a root node, Node A' 180, child nodes, Node B' 182 and Node C' 184, and further children nodes in elements 186 and 188. Each of these nodes 170, 172, 174, 180, 182, 184 includes a digest and data portion. The nodes in the simplified elements 176, 178, 186, 188 also include digests and data portions.

In a system such as that shown in FIG. 2, the digest of each node is calculated from the data and digests of its children. Accordingly, the digests of the root nodes 151, 161 result from data contained in their entire Merkle trees. Therefore, if the first Merkle tree 155 and the second Merkle tree 165 store the same data, the digests 151, 161 of Node A 170 and Node A' 180 should be identical. As described above, other definitions of synchronicity are sometimes desired and can be achieved through embodiments described herein.

Figure 3:
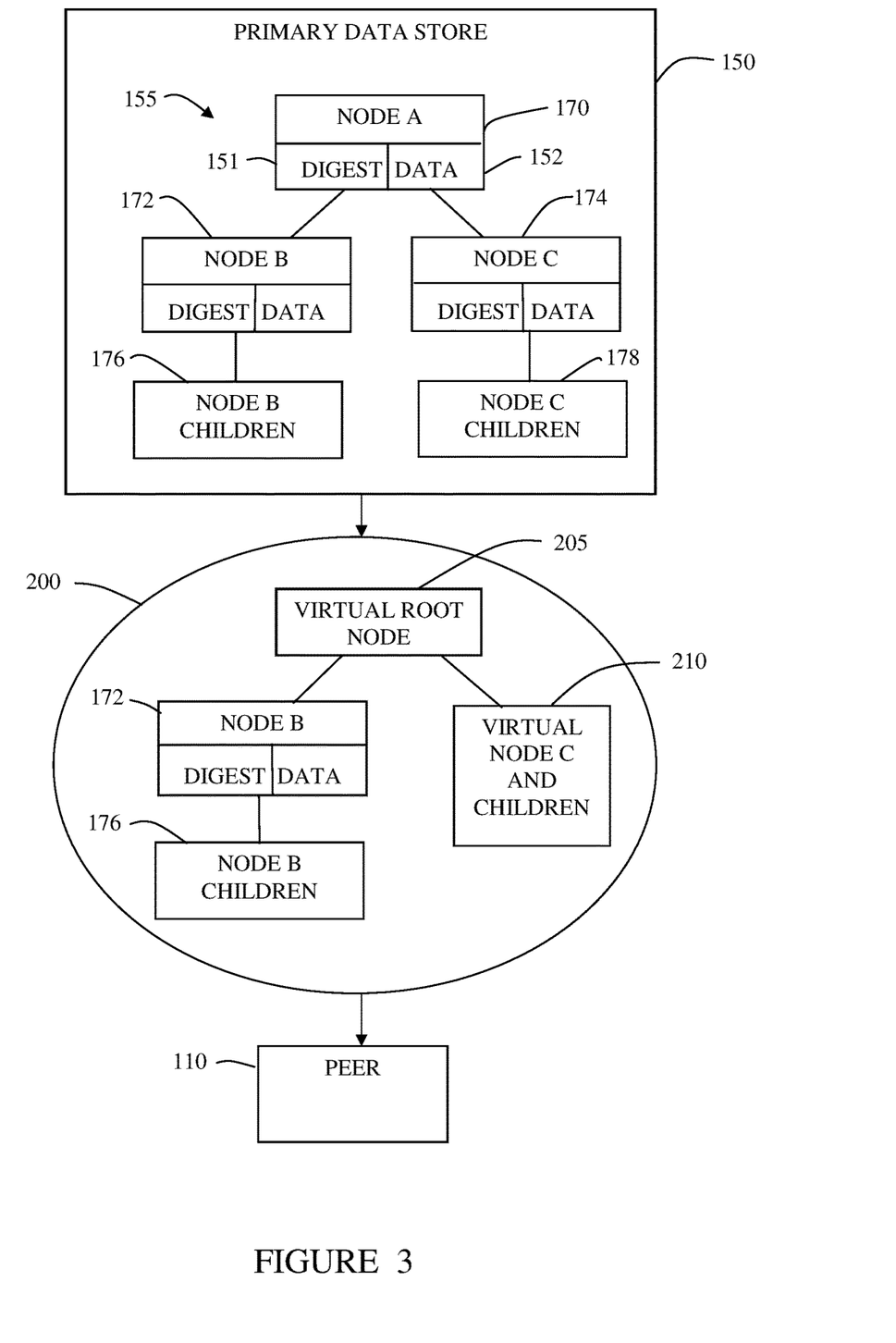
FIG. 3 is a block diagram illustrating a virtual hash tree to accomplish a data synchronization in distribution mode.

FIG. 3 is a block diagram of the primary data store 150 of FIGS. 1 and 2. The block diagram illustrates data transfer in distribution mode. In this example embodiment, the available data in the primary data store 150 is segregated into two categories: informational data and authentication data. The informational data is stored in node B 172 and its children and the authentication data is stored in node C 174 and its children. In archival mode, the data synchronization system 120 would synchronize all the primary data with the peer. The data synchronization, however, is capable of synchronization modes for partial data sets such as distribution mode. In distribution mode, only the informational data is synchronized between systems.

In a conventional synchronization system, the archival mode is typically the only mode available. That is, all data is always synchronized. Compared to a distribution mode of synchronization, however, the archival mode has several disadvantages. One disadvantage is that transferring all data is slower and more resource intensive than transferring only the subsets of data defined for the given alternative synchronization mode. Another disadvantage is that some data may be sensitive, and synchronizing sensitive data may expose it to an audience to whom the data should not be available. In the present example, authentication data on one system may need to be distinct from authentication data on another system.

To perform synchronization of subsets of data, the data synchronization system 120 constructs a virtual Merkle tree 200. In distribution mode, the virtual Merkle root has one child which is the root of the subtree holding representative values for the informational data. In this example, the virtual Merkle tree 200 has a virtual Merkle root 205 and a distribution branch topped by Node B 172. The virtual Merkle tree has a virtual authentication branch, virtual Node C and its children 210. In an alternative arrangement, the root of the subtree can be directly used as the virtual root. In other modes, the virtual Merkle root may only one child. When operating in distribution mode, because the only subtree in use covers only the set of data identified as informational data, the remote system can holds its own authentication data to be used locally without the systems being considered out of synchronization. The virtual data tree 200 is provided to the peer 110. The peer 110 compares the virtual tree 200 with its own has tree (not shown in this figure) and requests the data it needs based on any differences found.

Figure 4:
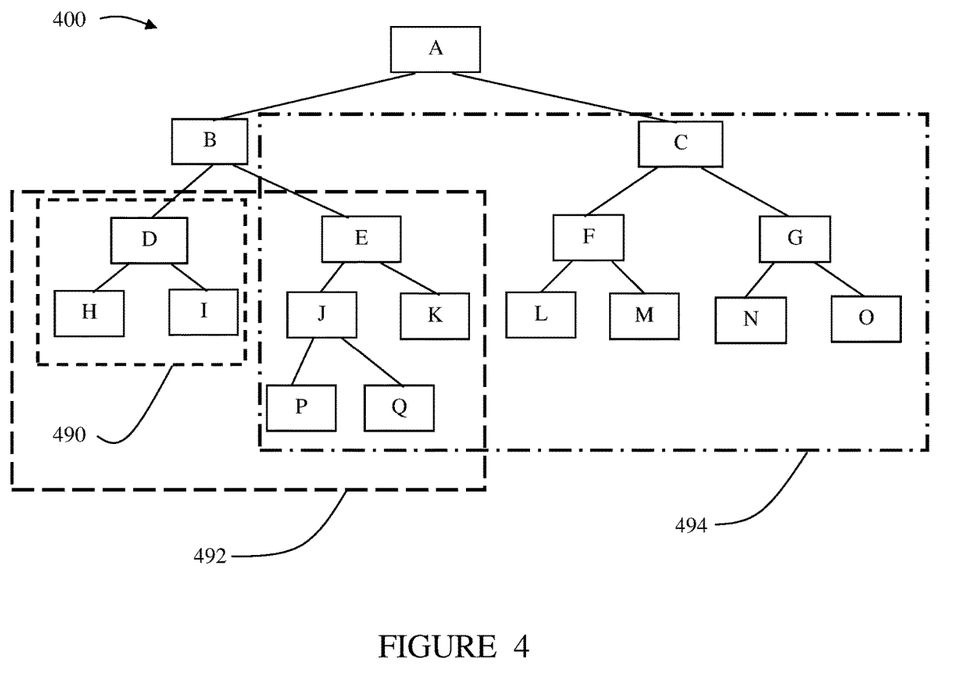
FIG. 4 is a diagram of a hash tree grouped into a plurality of distribution modes.
Figure 5:
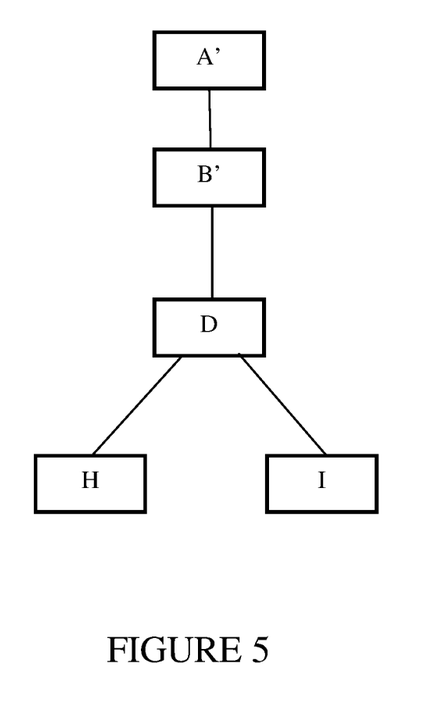
FIG. 5 is a diagram of a virtual hash tree for a first mode of the plurality of distribution modes of FIG. 4.
Figure 6:
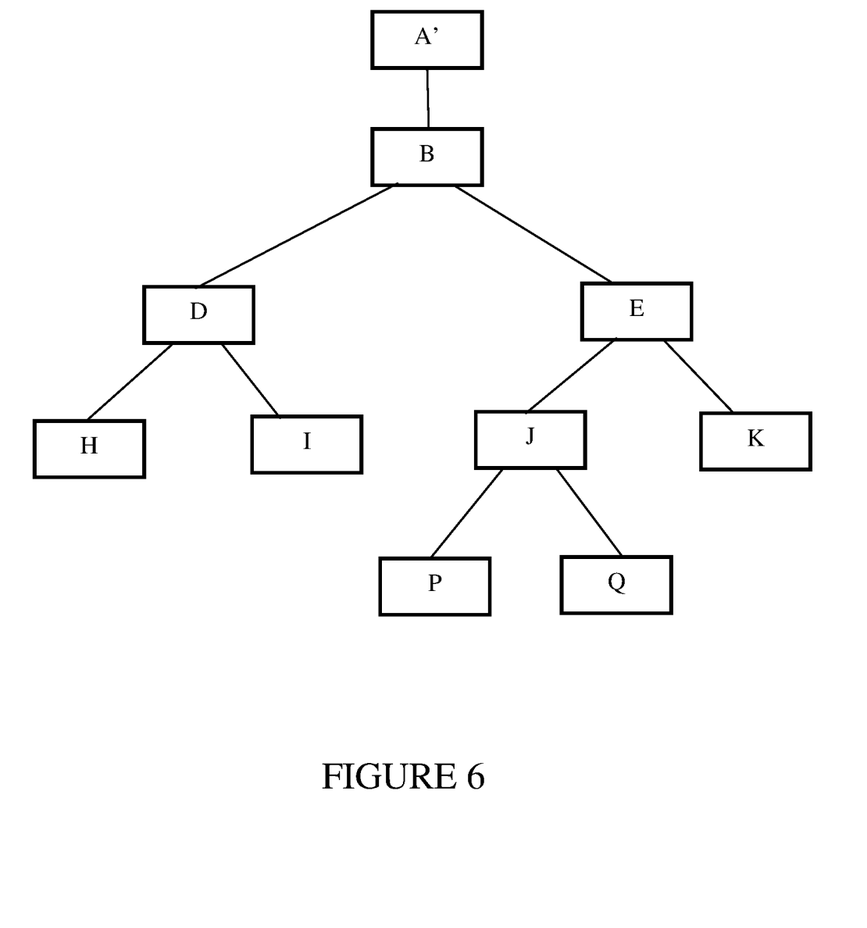
FIG. 6 is a diagram of a virtual hash tree for a second mode of the plurality of distribution modes of FIG. 4.
Figure 7:
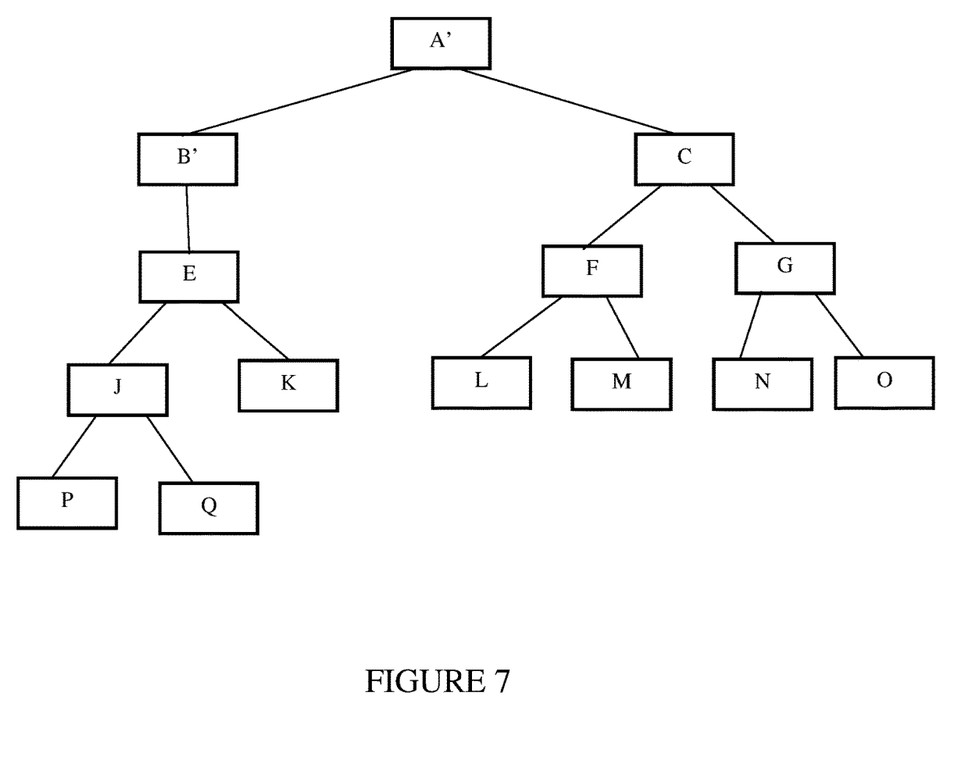
FIG. 7 is a diagram of a virtual hash tree for a third mode of the plurality of distribution modes of FIG. 4.

FIG. 4 is a diagram of a hash tree having a root node A, child nodes B and C and further children nodes. In this embodiment, a single local system can present different root values and different overall Merkle trees to different remote systems depending on the synchronization mode that is independently in use between the local system holding the hash tree and each remote. Nodes in the tree 400 are grouped into three modes 490, 492 and 494. A first mode 490 has nodes D, H and I. A second mode 492 has nodes E, J, K, P and Q. A third mode 494 has modes E, J, K, P, Q, C, F, G, L, M, N and O. A virtual tree is constructed for each mode. FIG. 5 shows a virtual tree constructed for the first mode, mode 490. FIG. 6 shows a virtual tree constructed for the second mode, mode 492. FIG. 7 shows a virtual tree constructed for the third mode, mode 494.

In an alternative embodiment, information within a synchronization structure is decoupled from its representation in the structure. This enables state updates during synchronization to be processed by a peer system's synchronization structure without needing to be representative of the underlying data referred to by the state updates.

When such a state update is received by a peer, the peer applies the update to its synchronization structure as if it had received data matching that on the primary system, while the actual data it received may either be an empty set or modified in some way. In this way, the peer's synchronization structure matches that of the primary system and purports to represent the same sets of data, while the actual data stored is distinct between the peer and primary systems.

Figure 8:
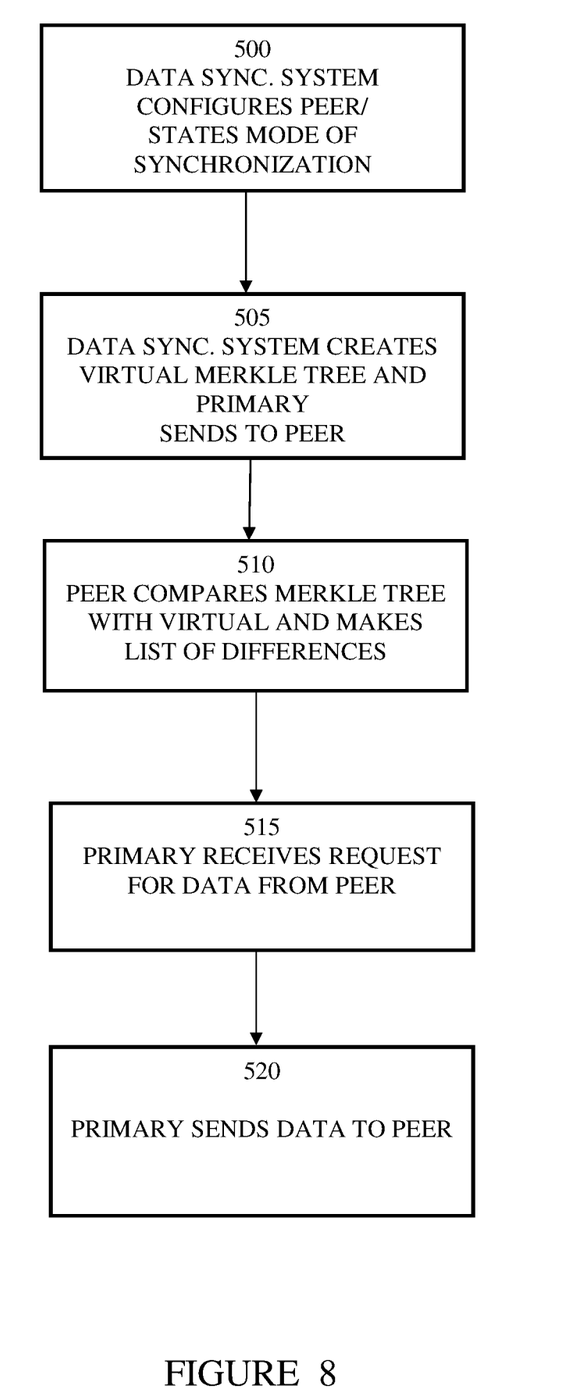
FIG. 8 is a flow chart of a method according to embodiments of the present invention.

FIG. 8 is a flow chart of an embodiment of a method of the synchronization system 120 for synchronizing primary data and peer data.

At step 200, the data synchronization system 120 configures the peer. The configuration depends on whether the peer is newly in communication with the data synchronization system 120 or whether the peer has dropped off temporarily and is newly back or whether the peer simply needs a data update. The data synchronization system 120 decides the mode of synchronicity based on the peer identity and the configuration. For the purposes of this example, data synchronization system 120 determines that the mode is a data update that is less than the full data stored in the primary 110.

At step 505, the data synchronization system 120 creates a virtual Merkle tree according to the mode. The virtual Merkle tree limits the data available to the peer 120, however, provides a complete synchronization structure. The primary system 110 provides the virtual Merkle tree to the peer 120.

At step 510, the peer 120 compares its Merkle tree 155 to the virtual Merkle tree received from the primary system 110. In that comparison, the peer 120 creates a list of differences.

At step 515, the peer 120 requests data from the primary 110 according the list of differences.

At step 520, the primary 110 sends the data to the peer. In this method, the primary 110 and the peer 120 can be considered to be in synchronicity even though they do not store identical data.

Figure 9:
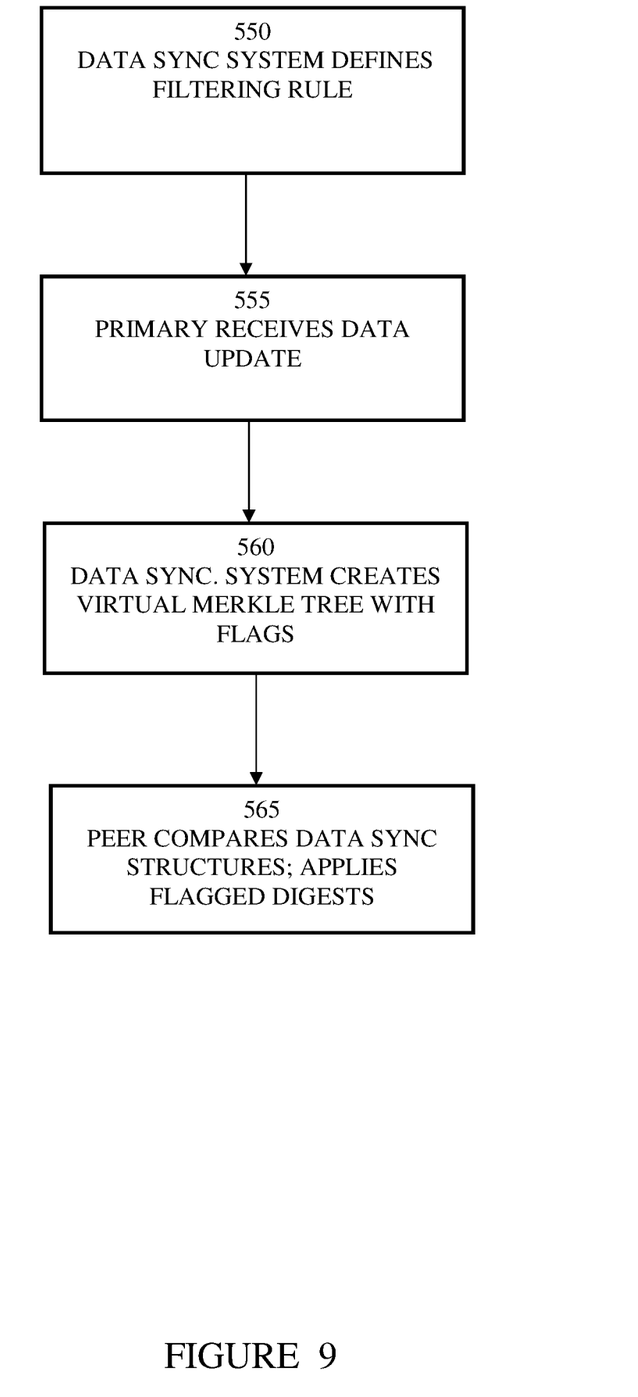
FIG. 9 is a flow chart of an alternative method according to embodiments of the present invention.

FIG. 9 shows a method according to an alternative embodiment that enables synchronization filtering. Filtering is used to allow two systems to determine that they are properly synchronized while data transfer during synchronization is actually controlled based on factors such as geographical, geopolitical, performance, and security needs. Filtering can match on any aspect of the underlying data as is reasonable for that data, e.g. path, modification time, tags, labels, etc. The filtering can be configured via multiple paradigms, such as allow lists and deny lists.

In the present example, the data synchronization system 120 operates in a distribution mode. The primary store 150 contains the full set of data some of which is identified for sharing with peer systems. Within the informational data in the primary data store 150 is a set of sensitive data that should not be received by a peer system due to the peer system's geolocation.

At step 550, a filtering rule is defined by the data synchronization system 120, indicating that only data with a specific region tag should be sent to the peer. At step 555, the primary system receives a data update. At step 560, the data synchronization system 120 examines the data update to create the appropriate data synchronization structure. When the data synchronization system 120 encounters a state update on any data not tagged with the specified region tag, the data synchronization adds a node to the Merkle tree that has the expected Merkle value of the data (e.g. a digest). The data portion of the node does not include the data but rather a flag indicating that the data was filtered. At step 565, the peer then applies the digest to its Merkle tree at the appropriate tree node, essentially pretending that the data exists locally when in fact it does not. As a result, the Merkle roots of the primary system and the peer system match, but the sensitive data has never actually been sent from the primary system to the peer.

While only a primary system and one peer system were used in the example above, it is to be understood that the present invention can be implemented in computing systems involving a plurality of peer systems that receive data from a primary system or alternatively, a network that has a plurality of primary systems synchronizing data with a plurality of receiving systems. The present invention should not be considered to be limited to the specific examples described above.

The difference between the methods described above with regard to FIGS. 8 and 9 is granularity. Whereas the embodiment first described enabled modular composition of synchronization systems from sub-systems holding representations of sets of data, the second embodiment can operate within the framework of the first to enable further filtering within these sets of data. To put it another way, the mode of synchronization can be determined first, then the data further filtered within that agreed-upon mode. Together these embodiments describe a flexible and granular set of methods for creating synchronization systems.

Embodiments of present invention are applied to systems for data replication, however alternatively the embodiments described here are applicable to other system synchronization purposes.

It is to be understood that the above-identified embodiments are simply illustrative of the principles of the invention. Various and other modifications and changes may be made by those skilled in the art which will embody the principles of the invention and fall within the spirit and scope thereof.

We claim:

1. A computing system for data synchronization and segregation of cloud computing resources using virtualized and modular representations, wherein a virtualized representation comprises a virtual data synchronization structure composed of one or more sub-structures, each sub-structure representing a subset of the underlying data, the computing system comprising:
   a primary data store comprised of a memory, and storing data in a hash tree structure, the hash tree structure including a plurality of nodes, each node of the plurality having a data portion and a digest portion representing changes to the data portion;
   a modes module executed by at least one processor for storing a plurality of modes, wherein each mode is a synchronization profile that defines a set or subset of data for synchronization, the subset of the data being less than a full set of the data stored in the primary data store, each of the plurality of modes configured to operate on only the subset of the data defined by the profile, at least one mode of the plurality of modes being based on a geolocation of a distribution peer computing system; and
   a synchronization structure module executed by at least one processor for creating one or more virtual data synchronization structures, wherein each virtual data synchronization structure is a hash tree structure representing only the subset of data defined by the corresponding mode, and at least one virtual data synchronization structure is created for each of the modes in the plurality of modes, wherein the synchronization structure module is further configured to filter data sent between systems to replace data stored in a data portion of each node with a flag when the data does not meet a filtering criteria,
   the computing system to provide at least one virtual data synchronization structure to the distribution peer computing system, wherein the distribution peer computing system compares the virtual data synchronization structure to its local hash tree and generates requests for data updates based on differences identified, and the computing system to receive requests for data updates from the distribution peer computing system in accordance with the mode used to create the at least one virtual data synchronization structure of the cloud computing resources.

2. The computing system of claim 1 wherein the primary data store is distributed among a plurality of computing systems.

3. The computing system of claim 1 wherein the computing system provides at least one virtual data synchronization structure to each of a plurality of distribution peer computing systems, the computing system to receive requests for data updates from each of the plurality of distribution peer computing systems.

4. The computing system of claim 1 wherein the primary store and the distribution peer computing system have, when in a state of synchronization, independent authentication data.

5. The computing system of claim 1 wherein the modes module includes one or more modes based on a limiting factor related to the distribution peer computing system.

6. A computer-implemented method for data synchronization and segregation of cloud computing resources, the method comprising:
- determining a mode from a plurality of modes, the mode describing a data distribution operation on a peer computing system, the data distribution operation to accomplish a data distribution of a subsection of data stored in a primary data store to the peer computing system, the subsection of the data being less than a full set of the data stored in the primary data store, each of the plurality of modes configured to operate on only the subsection of the data, the mode being based on a geolocation of the peer computing system, wherein each mode is a synchronization profile that defines a set or subset of data for synchronization, and each of the plurality of modes is configured to operate only on the subset of data defined by the profile;
- constructing a virtual hash tree according to the mode, the virtual hash tree comprising a plurality of nodes, each node of the plurality of nodes having a data portion and a digest portion representing changes to the data portion, the virtual hash tree comprising a representation of the subsection of data from the data portion of each node, wherein the virtual hash tree is composed of one or more sub-structures, each sub-structure representing a subset of the underlying data, and the virtual hash tree represents only the subset of data defined by the corresponding mode and wherein constructing the virtual hash tree further comprises filtering data sent between systems by replacing data stored in a data portion of each node with a flag when the data does not meet a filtering criteria;
- providing the virtual hash tree to the peer computing system;
- receiving a data request from the peer computing system in response to the virtual hash tree, the data request including one or more virtual data synchronization structures, at least one virtual data synchronization structure of the cloud computing resources for accomplishing the mode of the plurality of modes; and
- distributing data to the peer computing system according to the data request.

7. The computer-implemented method of claim 6 further comprising: configuring the peer computing system to establish the mode.

8. The computer-implemented method of claim 6 wherein the data request is a list of differences between a local hash tree on the peer computing system and the virtual hash tree.

9. The computer-implemented method of claim 6 wherein the step of constructing the virtual hash tree further comprises filtering data by operating on selected nodes in the virtual hash tree.

10. The computer-implemented method of claim 9 wherein operating on selected nodes in the virtual hash tree further comprises replacing data stored in a data portion of each node with a flag.

11. The computer-implemented method of claim 6 further comprising:
- determining a plurality of modes, the plurality of modes describing data distribution operations on a plurality of peer computing systems, the data distribution operations to accomplish data distributions of subsections of data stored in a primary data store to the plurality of peer computing systems;
- constructing virtual hash trees according to the modes, each virtual hash tree comprising a representation of a selected subsection of data stored in the primary data store;
- providing the virtual hash trees to the peer computing systems.

12. The computer-implemented method of claim 6 wherein the step of determining a mode further comprises:
- determining the mode describing a data distribution operation on a peer computing system, the data distribution operation to accomplish a data distribution of a subsection of data stored in a plurality of primary data stores to the peer computing system.

13. A non-transitory computer-readable storage medium storing a computer program, that when executed by at least one processor, causes the at least one processor to perform a method for data synchronization and segregation of cloud computing resources, the method comprising:
- determining a mode from a plurality of modes, the mode describing a data distribution operation on a peer computing system, the data distribution operation to accomplish a data distribution of a subsection of data stored in a primary data store to the peer computing system, the subsection of the data being less than a full set of the data stored in the primary data store, each of the plurality of modes configured to operate on only the subsection of the data, the mode being based on a geolocation of the peer computing system, wherein each mode is a synchronization profile that defines a set or subset of data for synchronization, and each of the plurality of modes is configured to operate only on the subset of data defined by the profile;
- constructing a virtual hash tree according to the mode, the virtual hash tree comprising a plurality of nodes, each node of the plurality of nodes having a data portion and a digest portion representing changes to the data portion, the virtual hash tree comprising a representation of the subsection of data from the data portion of each node, wherein the virtual hash tree is composed of one or more sub-structures, each sub-structure representing a subset of the underlying data, and the virtual hash tree represents only the subset of data defined by the corresponding mode and wherein constructing the virtual hash tree further comprises filtering data sent between systems by replacing data stored in a data portion of each node with a flag when the data does not meet a filtering criteria;
- providing the virtual hash tree to the peer computing system;
- receiving a data request from the peer computing system in response to the virtual hash tree, the data request including one or more virtual data synchronization structures, at least one virtual data synchronization structure of the cloud computing resources for accomplishing the mode of the plurality of modes; and distributing data to the peer computing system according to the data request.

14. The non-transitory computer-readable storage medium of claim 13 further comprising:
configuring the peer computing system to establish the mode.

15. The non-transitory computer-readable storage medium of claim 13 wherein the data request is a list of differences between a local hash tree on the peer computing system and the virtual hash tree.

16. The non-transitory computer-readable storage medium of claim 13 wherein constructing the virtual hash tree further comprises filtering data by operating on selected nodes in the virtual hash tree.

17. The non-transitory computer-readable storage medium of claim 16 wherein operating on selected nodes in the virtual hash tree further comprises replacing data stored in a data portion of each node with a flag.

18. The non-transitory computer-readable storage medium of claim 13 further comprising:
determining a plurality of modes, the plurality of modes describing data distribution operations on a plurality of peer computing systems, the data distribution operations to accomplish data distributions of subsections of data stored in a primary data store to the plurality of peer computing systems;
constructing virtual hash trees according to the modes, each virtual hash tree comprising a representation of a selected subsection of data stored in the primary data store;
providing the virtual hash trees to the peer computing systems.

19. The non-transitory computer-readable storage medium of claim 13 further comprising:
determining the mode describing a data distribution operation on a peer computing system, the data distribution operation to accomplish a data distribution of a subsection of data stored in a plurality of primary data stores to the peer computing system.

* * * * *